United States Patent

[11] 3,586,191

[72] Inventor John J. Brown, Jr.
Siler City, N.C.
[21] Appl. No. 816,274
[22] Filed Apr. 15, 1969
Division of Ser. No. 816,243, Apr. 15, 1969
[45] Patented June 22, 1971
[73] Assignee Forrest Paschal Machinery Company
Siler City, N.C.

[54] LOAD/UNLOAD TRANSFER CARRIAGE
6 Claims, 6 Drawing Figs.
[52] U.S. Cl............................................. 214/6 FS,
214/1 BT, 214/8.5 D
[51] Int. Cl..................................................... B65g 60/00
[50] Field of Search............................................ 214/1 BS 2,
1 B 2, 6, 6 A, 6 M, 6 FS, 6 DS, 6 G, 6 P, 8.5 D, 6 P, 301

[56] References Cited
UNITED STATES PATENTS
2,524,846 10/1950 Socke et al. ................... 214/6 (FS) X
2,704,593 3/1955 Galloway......................... 214/6 (M) X
3,037,644 6/1962 Segur ............................... 214/6 (A)
3,151,753 10/1964 Verrinder et al. ............ 214/6 (P) X
3,225,891 12/1965 Hickin et al. ................. 214/1 (BS2) X
3,231,118 1/1966 Willsey............................ 214/301
3,367,823 2/1968 Clausen et al. .............. 214/6 (FS) UX
3,412,874 11/1968 Shiffer............................. 214/6 (A)
3,450,287 6/1969 Dubus ........................... 214/1(B2)X
FOREIGN PATENTS
554,399 1/1957 Italy ............................. 214/6 FS
1,122,893 1/1962 Germany..................... 214/8.5 D Primary Examiner—Gerald M. Forlenza
Assistant Examiner—Robert J. Spar
Attorney—Hunt, Heard and Rhodes ABSTRACT: The present invention is directed to an article or package loading and unloading machine, and more specifically to a machine for transferring articles from a relatively stationary platform or fixed path conveyor to an adjacent, movable skid or car and simultaneously transferring articles from a second car located adjacent said stationary platform or conveyor into said platform.

Basically the machine comprises two vertically reciprocal pickup heads arranged in cooperating relationship on a single, horizontally reciprocal frame or carriage, one of the pickup heads transferring articles from the stationary platform to an adjacent, empty skid or other portable platform, and the second pickup head simultaneously transferring articles from a second loading skid onto the stationary platform during the return trip of the carriage.

LOAD/UNLOAD TRANSFER CARRIAGE

CROSS-REFERENCE TO RELATED APPLICATIONS

This application is a division of applicant's copending application, Ser. No. 816,243, filed Apr. 15, 1969, entitled System for Automatically Handling Setters Filled with Ceramic Tile.

BACKGROUND OF THE INVENTION

During the processing of some types of articles through a manufacturing plant, it commonly becomes necessary to remove the articles from a stationary platform or from one station on a conveyor system, send them elsewhere in the plant for a separate operation, then bring the articles back to the same station to continue their processing flow. For example, as described in applicant's copending application Ser. No. 816,243, in the manufacture of ceramic tile squares, raw or green tiles to be sent to a kiln for firing are loaded by a suitable loading means into setters or saggers as the setters move along a first conveyor to be sent to a kiln for firing. The setters then embark on a path around a closed conveyor loop, and are transferred to a second indexing conveyor, whereupon they are removed and placed on a kiln car for firing in a kiln. After the tiles are cured, the kiln car returns to the conveyor system where the setters are removed. The second conveyor, transferred to a third conveyor where they are emptied, the tiles cleaned and the setters returned to the loading means for reloading.

In such a system it has been found advantageous to utilize a transfer carriage comprising a single frame and hydraulic system supporting a pair of pickup heads. One pickup head lifts and transfers setters from the second conveyor, depositing them on an adjacent, empty kiln car, and during the return trip the other pickup head lifts and transfers setters from a loaded kiln car, depositing them on the second conveyor, so that during each transfer or movement of the transfer carriage, a load of setters is being transported, eliminating wasted motion. The term "relatively stationary platform," as used herein is defined as a loading dock or fixed path conveyor as opposed to a portable skid or car.

It is therefore an object of this invention to provide a load/unload transfer carriage for simultaneously transferring packages from a relatively stationary platform to a portable skid or car and from a second skid or car back to the stationary platform.

It is another object of this invention to provide a load/unload transfer carriage which is reciprocal between a relatively stationary platform and an adjacent, parallel line of portable skids or cars, wherein a load of articles is transported during each horizontal movement of the carriage.

It is another object of the invention to provide a transfer carriage of the type described which is activated in response to the receipt of a full course of articles to unload one course of articles from the conveyor and simultaneously load another course onto the conveyor.

It is yet another and more specific object of the invention to provide a transfer carriage of the type described comprising a pair of horizontally and vertically reciprocal pickup heads, one of said heads adapted to grasp and transfer a course of articles from a fixed path conveyor to an adjacent portable platform, and the other pickup head adapted to simultaneously grasp and transfer a course of articles from a filled portable platform over onto the same conveyor at a point spaced successively down the conveyor from said first course.

Further objects and advantages within the scope of this invention such as relate to arrangements, operations, and function of the related elements of the structure, and various details of the construction will become apparent from a consideration of the specification and drawings of the illustrated embodiment of the invention.

The operation of the machine and objects of the invention may be better understood in connection with a complete description which will be given in connection with the drawings, wherein.

LOAD/UNLOAD TRANSFER CARRIAGE

Figure 1:
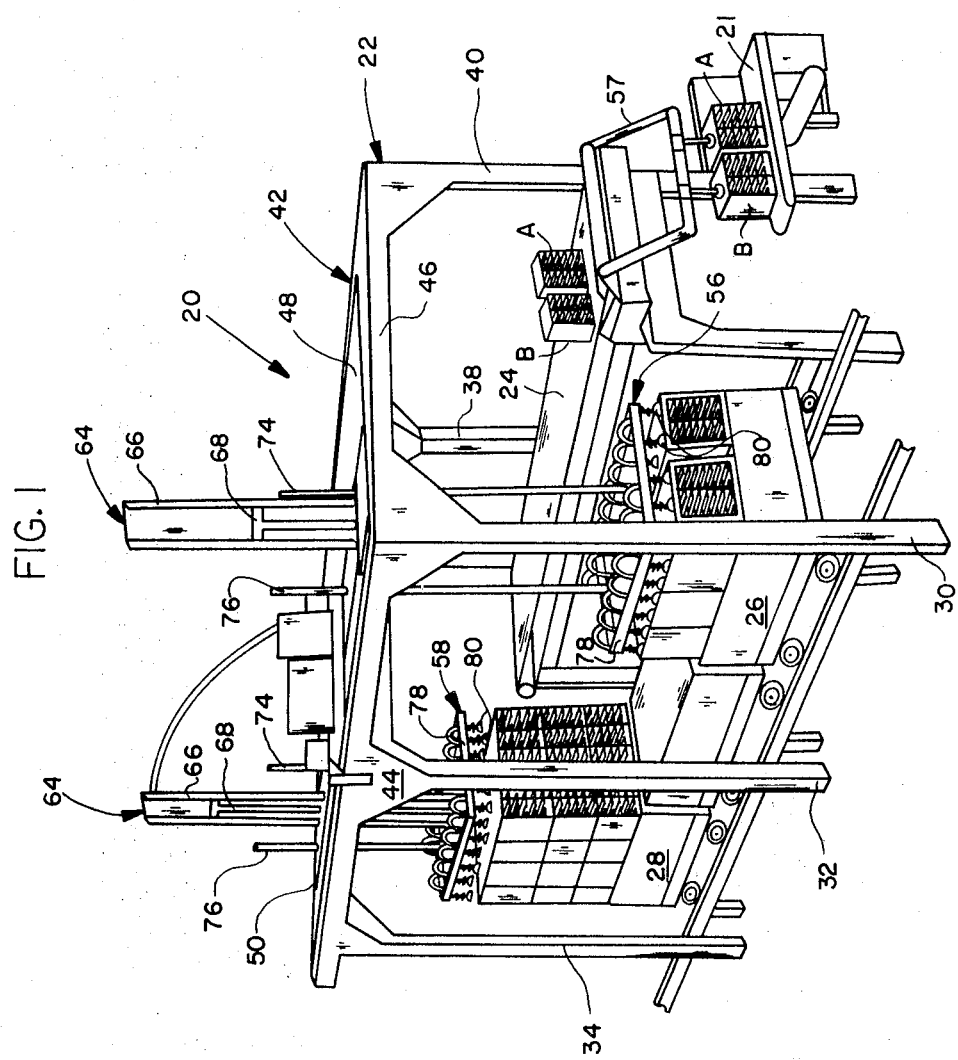
FIG. 1 is a perspective illustration of the load/unload transfer carriage according to the present invention.

Turning now to the drawings and more particularly to FIG. 1, the load/unload transfer carriage 20 comprises a framework 22 overlying the major portion of indexing conveyor 24 and the adjacent loading positions of portable platforms, skids or cars 26 and 28. The framework 22 includes vertical support beams 30, 32, 34, 36, 38, and 40 supporting an upper, horizontally disposed, rectangular frame 42 which in turn comprises generally front channel 44, rear channel 48, and side channels 46 and 50 fastened together and secured to the six vertical supports. Intermediate channel 52 extends between front channel 44 and rear channel 48 parallel to and approximately midway between the side channels 46 and 50.

Figure 2:
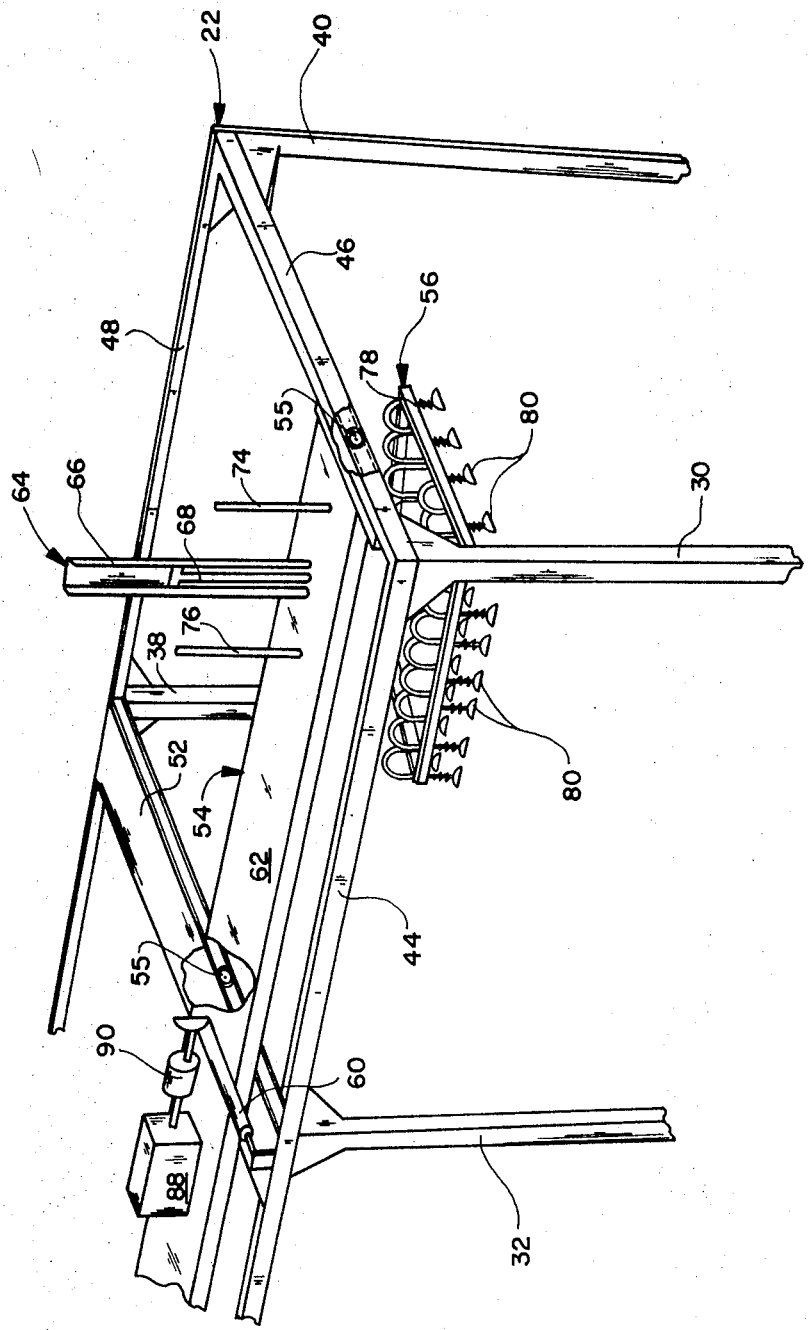
FIG. 2 is a perspective illustration with parts broken away of the upper portion of the load/unload transfer carriage shown in FIG. 1.
Figure 3:
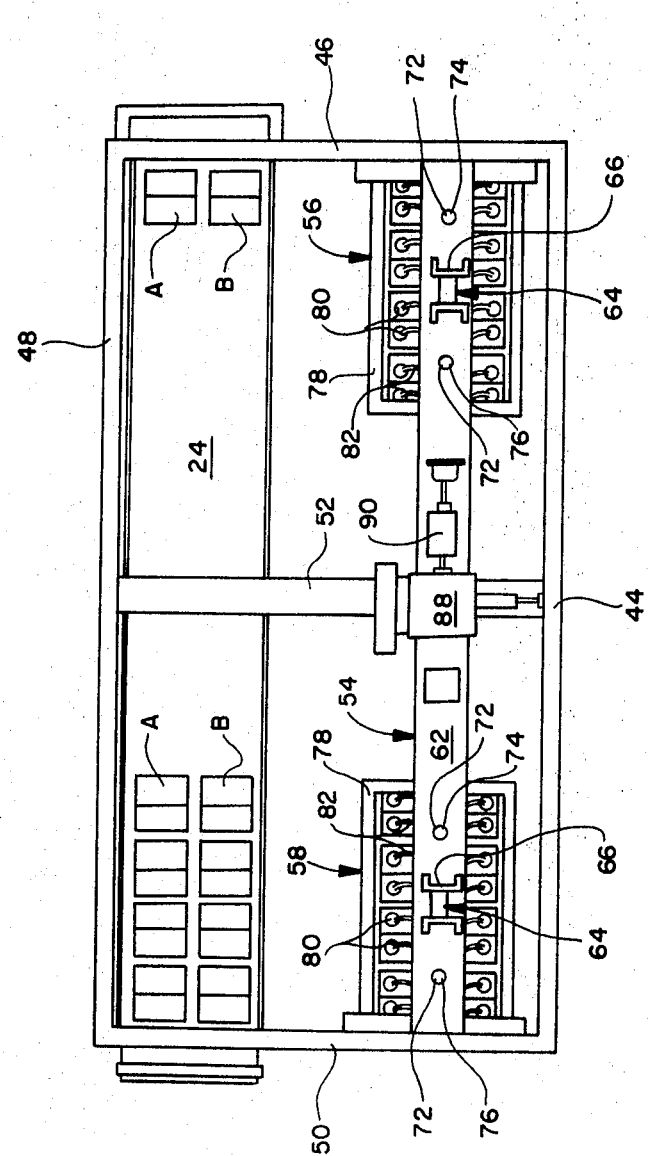
FIG. 3 is a plan view of the load/unload transfer carriage shown in FIG. 1.
Figure 4:
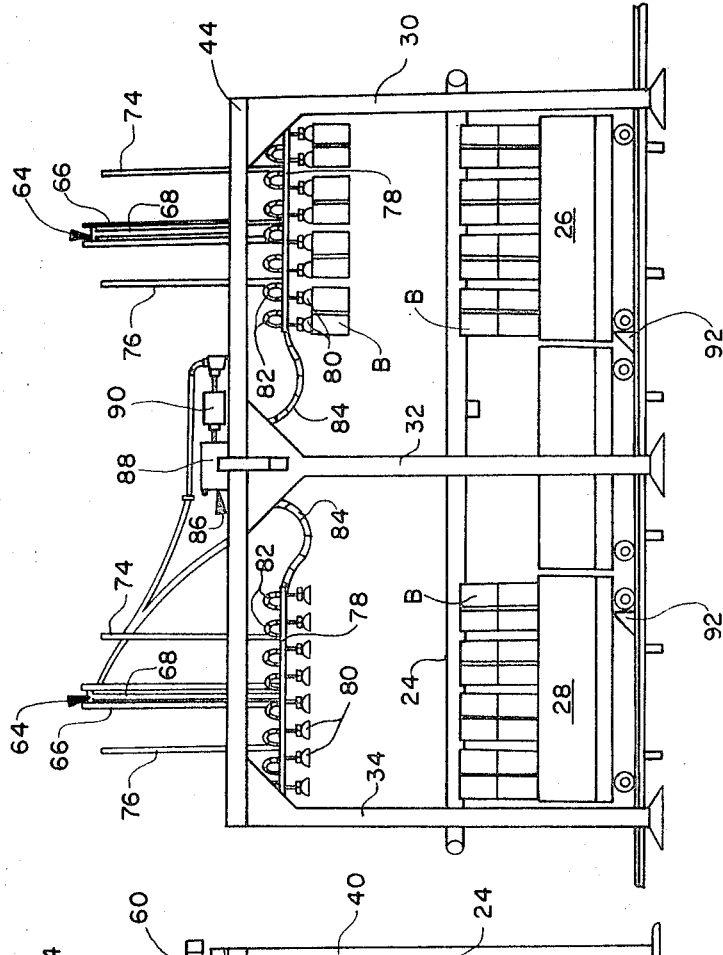
FIG. 4 is an elevation view of the transfer carriage shown in FIG. 1.
Figure 5:
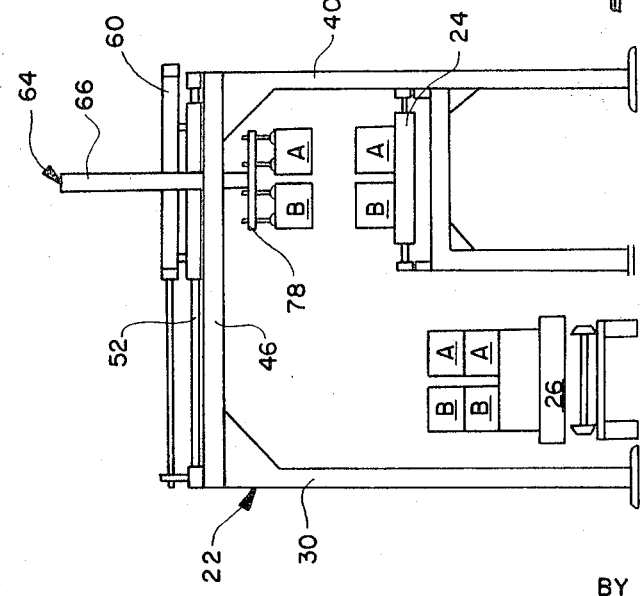
FIG. 5 is an end view of the transfer carriage shown in FIG. 1.

Referring now to FIGS. 2 and 3, a transversely reciprocal carriage or beam 54 includes wheels 55 which are supported on the lower flanges of channels 46, 50, and 52 and adapted to roll back and forth in a front to rear direction. Beam 54 supports and transversely reciprocates pickup heads 56 and 58 between a first position above indexing conveyor 24 and a second position above portable platforms 26, 28 and is operated by a double acting hydraulic cylinder 60, having the piston thereof attached to frame 42 and the housing thereof attached to beam 54 (see FIG. 5).

More specifically, carriage 54 comprises a central support beam 62 to which hydraulic cylinder 64 is attached with the housing 66 of hydraulic cylinder 64 extending above support beam 62 and the operating piston 68 extending through an opening 70 in central beam 62.

Pickup head 56 is suspended from the lower end of the hydraulic piston 68 which operates to reciprocate pickup head 56 in a vertical path to lift and lower the courses of articles. Support beam 62 further includes a pair of openings 72, one on either side of opening 70 through which support rods 74 and 76 are slidably received. The lower end of support rods 74 and 76 are connected to the framework of pickup head 56, and operate to prevent skewing of the pickup head during transfer.

Pickup head 56 itself comprises a rectangular horizontal framework 78 attached to piston 68 and supporting a series of downwardly facing vacuum cups 80 which engage packages A and B when pickup head 56 is lowered. A length of flexible tubing 82 connects each vacuum cup 80 with one of several vacuum conduits 84 supported by rectangular framework 78. A longer section of flexible tubing connects each vacuum conduit 84 with a source of suction 86 which in turn comprises essentially a motor 88 driving a centrifugal pump 90. A portion of rectangular frame 42, for example front member 44 is actually a hollow, longitudinal member sealed from the atmosphere and connected into the vacuum system to provide a vacuum reservoir in case of a power failure or if the source of vacuum fails. This insures that the course of packages being held at the time will not fall causing damage.

Pickup head 58 is identical to 56 as far as the mechanical parts are concerned, and therefore the same element numbers will be used to represent the details corresponding to pickup head 56. The distinguishing feature between pickup head 58 and 56 is that the pneumatic cycle of pickup head 58 is the reverse of pickup head 56, so that when the vacuum is applied to the vacuum cups 80 of pickup head 56 the vacuum is released from the suction cups of pickup head 58 and vise versa.

The vertical movement of pickup heads 56, 58 occurs between an upper, constant level transfer position and a lower, variable-level release/pickup position. At the upper level, the pickup heads always return to the same position which is obtained when they reach the upper limit of their movement. A switching or other suitable means is used to terminate the movement thereof when the upper limit is reached. The pickup heads, including a course of setters when such is the case, are then in a position for transfer that will allow the horizontal movement of support beam 54 between its two positions without the heads or setters coming into contact with any part of the system, which would cause damage thereto or interfere with the operation thereof. The lower, variable-level release/pickup position is defined by the level to which the pickup heads extend during their downward movement before the movement is terminated by a sensing means indicating that the pickup heads are at their proper level for releasing or picking up a course of setters. When moving downwardly, the movement of the pickup heads is independent of each other in that they each seek their own proper level at which to conduct their pickup or release operation.

Figure 6:
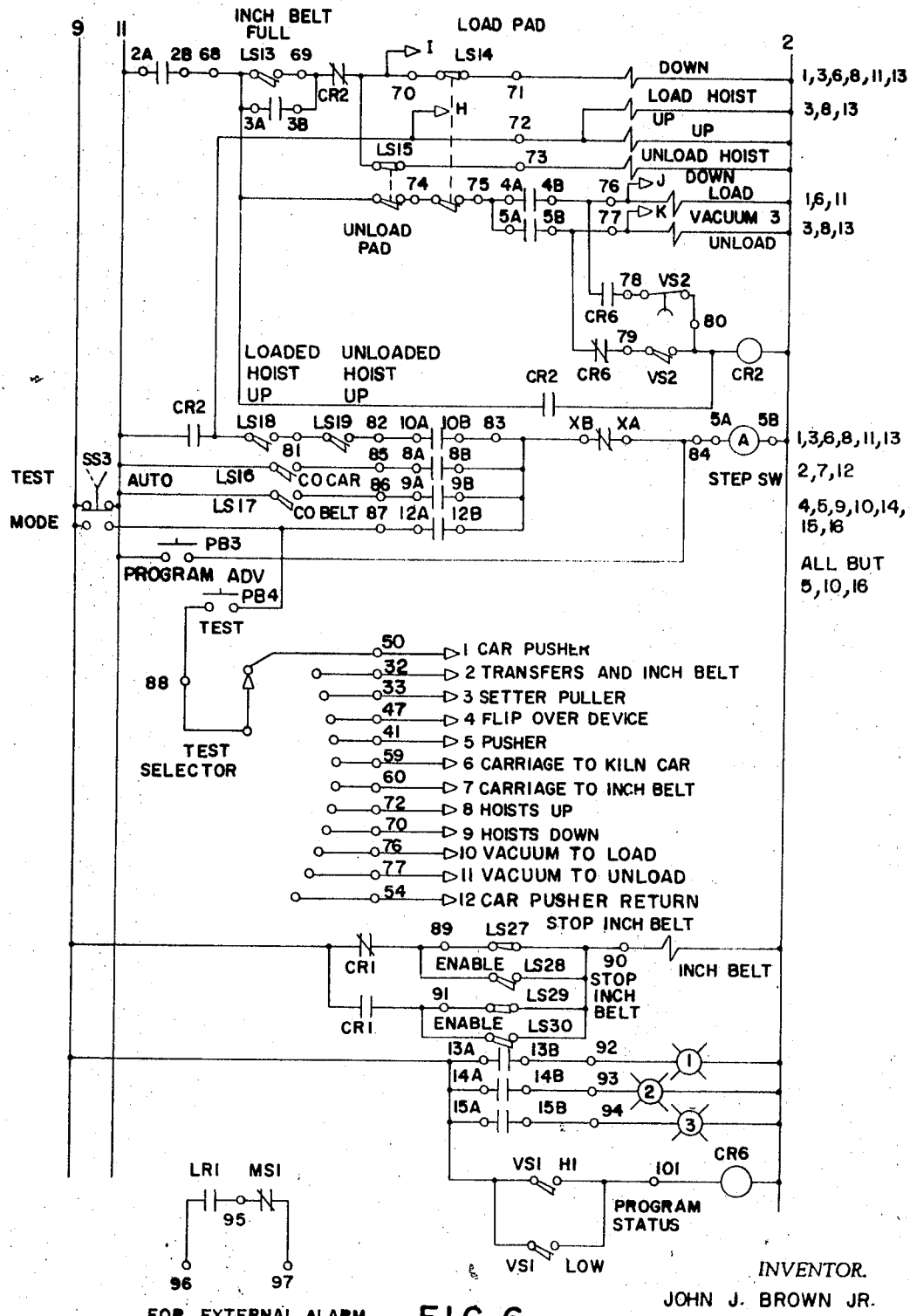
FIG. 6 is a schematic wiring diagram o part of the electrical control system used in the arrangement of FIG. 1.

In operation, a portable platform, skid or car 28 returns to the transfer carriage loaded with several courses of packages which have had operations performed on them elsewhere, where it is positioned adjacent indexing conveyor 24 beneath pickup head 58. An empty car 26 is similarly positioned adjacent the other or head end of conveyor 24 beneath pickup head 56. After a complete course of packages is loaded onto the initial end of conveyor 24, by transfer means 57 that lifts a pair of setters A and B from a first conveyor 21, and transfers them onto the surface of conveyor 24, which conveyor indexes forwardly each time a pair of setters is transferred thereon to stop said setters at positions forming a course or layer, pickup carriage 20 is activated by appropriate signal such as a limit switch LS13 (FIG. 6). To clarify the operation of conveyor 24, as transfer device 57 lifts a pair of setters A and B and transfers them onto conveyor 24, a series of photoelectric eyes or cells (not shown) are mounted adjacent the entrance end of indexing conveyor 24 and are selected in sequence by a Step Switch (not shown) to stop setters A and B at positions which form a course or layer. The setters advance one position at a time along the indexing conveyor 24, and upon the filling of the course or layer, the pickup heads 56 and 58 then descent until vacuum cups 80 of pickup head 56 engage the top wall of packages A and B, whereupon a sensing means (not shown) terminates the downward movement thereof and the vacuum is applied to grasp the packages, whereupon the pickup heads are elevated. During this operation pickup head 58 contains the last or lower course of packages from the previous car 28, and the vacuum is released to deposit them on conveyor 24 at the same time the vacuum to pickup head 56 is applied. A course, after being removed from car 28 and deposited on conveyor 24, moves to the end of said conveyor where it is removed, one pair of setters at a time, by a transfer means (not shown) similar to the transfer means 57 positioned at the other end of conveyor 24, and placed on a third conveyor for unloading of the setters.

When a course of packages has been lifted and the pickup head 56 reaches its upper extent, hydraulic cylinder 60 is activated by the advance of step switch A to move carriage 54 transversely to a position where pickup head 56 is above empty car 26. Hydraulic cylinder 64 is then activated by a further advance of step switch A and operates to lower pickup heads 56 and 58 whereupon the vacuum is released to deposit the course of packages onto car 26, while pickup head 58 engages the top course of packages from loaded car 28 and the vacuum applied thereto. Pickup heads 56 and 58, though further advances of step switch A are then elevated to their uppermost position and traverse back to a position overlying conveyor 24. When another course of packages is formed on the surface of conveyor 24, the cycle is repeated, and after every third cycle a new loaded skid or car is moved into position beneath pickup head 58 by a standard under-car pusher device 92 and skid or car 26 which has become loaded is moved out, for processing elsewhere before returning as one of cars 28.

The present system is electrically controlled and hydraulically powered, the electrical controls comprising generally a system whereby a series of switches indicate or prove when each apparatus is ready to proceed to the next step. At such a time as all proofs are met, the system automatically activates each station to advance the entire machine one step.

A complete description of the present system is contained in applicant's copending application Ser. No. 816,243; therefore, only the electrical operation relevant to the present invention will be discussed herein.

At rest, the transfer carriage 54 is normally positioned over the indexing conveyor 24, with pickup head 56 empty and pickup head 58 full. At this time step switch A (FIG. 6) is in position 1. Limit switch LS13 is engaged and operated when the indexing conveyor 24 fills with course or layer of setters A and B containing green tile, activating both pickup heads 56 and 58 to bring them down to a position immediately above the surface of indexing conveyor 24. Limit switches LS14 and LS15 are engaged by the downward movement of pickup heads 56 and 58 respectively, and when both limit switches have been engaged, the vacuum valve VS3 shifts, releasing the load of setters from pickup head 58 and placing vacuum on the vacuum heads 80 of pickup head 56. Control relay CR2 then activates both pickup heads 56 and 58 to lift them, whereupon limit switches LS18 and LS19, are engaged, advancing step switch A to position 2, which energizes a traverse valve actuating hydraulic cylinder 60. Carriage 54 is then moved to a position over the kiln cars 26 and 28, whereupon a limit switch LS16 is engaged advancing the step switch to position 3. Pickup heads 56 and 58 are then lowered until limit switches LS14 and LS15 are engaged by pickup heads 56 and 58 respectively, whereupon the downward movement of the pickup heads is terminated. Vacuum switch 2 connected with pickup head 56 then closes, gripping a course of setters from kiln car 28 and simultaneously vacuum switch VS1 releases the vacuum to pickup head 56 dropping a course of setters into kiln car 26. The pickup heads 56 and 58 are then activated by control relay CR2, and lifted until limit switches LS18 and LS19 are engaged, providing the hoists are up and advancing step switch A to position 4. Control relay CR2 then releases as the step switch advances, whereupon the traverse valve is energized to return carriage 54 to a position atop the indexing conveyor 24, and limit switch LS17 is engaged, moving the step switch A to position 5. Pickup heads 56 and 58 then await a signal from limit switch LS13 which begins the cycle again. The transporting of the second course of setters occurs on steps 5, 6, 7, and 8 of step switch A and on position 9 the pickup heads 56 and 58 are waiting for the third course. The transporting of the third course occurs on positions 9—12 of step switch A, whereupon shifting of the kiln cars occurs. After the kiln cars are moved and the proof satisfied, step switch A resets to position 1 where the cycle begins again.

There is thus provided a load/unload transfer carriage which is adapted to simultaneously transfer articles from a relatively stationary platform to an adjacent portable platform and from a second portable platform back to the stationary platform. Such an arrangement eliminates empty moves of the carriage which normally occur on its return.

It is obvious that various changes and improvements may be made without departing from the scope of the invention. For example, hydraulic cylinders are disclosed as being the motive force for the transfers, however air cylinders could also be used. Therefore the invention is not to be limited by that which is illustrated in the drawings and described in the specification, but only as indicated in the accompanying claims.

What I claim is:

1. In a closed loop conveyor system for handling setters filled with ceramic tile, wherein said system includes a first conveyor having a loading means to fill said setters with uncured ceramic tiles, a second-indexing conveyor adapted to receive said loaded setters from said first conveyor and to accumulate said setters into a course of packages for removal from said second conveyor and stacking in courses on a first portable platform for transfer to a curing kiln, while courses of packages comprising setters of cured ceramic tiles are simultaneously unstacked from a second portable platform returned from the curing kiln to said second conveyor, said second conveyor being indexed forwardly each time a course of setters containing uncured tile is removed therefrom and a course of setters containing cured tile is deposited thereon in order to position another uncured course of setters for pickup and to carry away the setters of cured tiles previously deposited thereon, a third conveyor adapted to receive the setters of cured tiles from said second conveyor, wherein said improvement comprises a load/unload transfer means for transferring said courses of setters from said second conveyor to said first portable platform while simultaneously unloading courses of setters from said second portable platform onto said second conveyor, said transfer means comprising:

a. a supporting framework overlying said second conveyor and said first and second portable platforms;

b. a horizontally reciprocal support beam mounted on said framework and being reciprocal between a first position overlying said second conveyor and a second position overlying said first and second portable platforms, the longitudinal axis of said support beam being parallel to the longitudinal axis of said second conveyor;

c. vertically reciprocal pickup heads received on opposite ends of said support beam, sad pickup heads overlying said second conveyor when said support beam is in said first position and overlying said first and second portable platforms when said support beam is in said second position;

d. said pickup heads being vertically reciprocal between an upper constant level transfer position and a lower, variable level release/pickup position, the movement of each of said pickup heads from said upper position to said lower position being independent of each other;

e. a sensing means for terminating the downward movement of the pickup heads at the release/pickup point upon engagement of said pickup head with the top of said course of setters during pickup and upon engagement of the bottom of said course of setters with the deposit surface upon release thereof, whereby courses of setters may be picked up and deposited simultaneously at varying vertical positions while said support beam is in said second position; and f. means on said pickup head for selectively gripping said courses of setters when in engagement therewith in said lower position and releasing said setters when in said lower position.

2. The invention according to claim 1 wherein said supporting framework includes horizontally extending flanges and said reciprocal beam includes wheels attached thereto, said wheels riding along said flanges.

3. The invention according to claim 2 wherein said beam further is activated for horizontal movement by a double acting hydraulic cylinder.

4. The invention according to claim 3 wherein the housing of said hydraulic cylinder is attached to said beam and the free end of the piston of said cylinder is attached to said supporting framework.

5. The invention according to claim 1 wherein said beam further includes a pair of vertically mounted hydraulic cylinders, each of said first and second pickup heads attached to the free end of the piston of one of said hydraulic cylinders, whereby activation of the hydraulic cylinder raises and lowers the pickup heads.

6. The invention according to claim 1 wherein said pickup heads include a plurality of downwardly facing vacuum cups, said pickup heads having means associated thereto for terminating the downward movement thereof when said vacuum cups engage the upper surface of said packages, said vacuum cups being connected to a source of suction for gripping said articles and holding them during upward movement of said pickup heads.